United States Patent [19]

Hainaut et al.

[11] 3,818,059

[45] June 18, 1974

[54] PREPARATION OF TRIDECATRIENOIC ACID DERIVATIVES

[75] Inventors: Daniel Hainaut, Villemomble;
Edmond Toromanoff, Paris;
Jean-Pierre Demoute,
Montreuil-Sous-Bois, all of France

[73] Assignee: Roussel Uclaf, Paris, France

[22] Filed: Nov. 10, 1971

[21] Appl. No.: 197,527

[30] Foreign Application Priority Data
Nov. 13, 1970 France .............................. 70.40628

[52] U.S. Cl....... 260/410.9 R, 260/413, 260/486 H, 260/515 M, 260/539 R, 260/593 R, 260/665 R,

[51] Int. Cl... C07c 51/00, C07c 57/02, C07c 69/52
[58] Field of Search ..................... 260/410.9 R, 413

[56] References Cited
UNITED STATES PATENTS
3,014,052  12/1961  Guex et al. ...................... 260/410.9
3,712,922  1/1973  Henrick et al. .............. 260/410.9 R
3,728,396  4/1973  Siddall et al. .................. 260/593 R FOREIGN PATENTS OR APPLICATIONS
1,209,190  10/1970  Great Britain

OTHER PUBLICATIONS

Maecker "The Wittig Reaction," Organic Reactions Vol. 14, pp. 340–344 and 402–405 relied upon (1965).

*Primary Examiner*—Lewis Gotts
*Assistant Examiner*—Diana G. Rivers
*Attorney, Agent, or Firm*—Hammond & Littell

[57] ABSTRACT

A novel process for the preparation of alkyl 3,11-dimethyl-7-ethyl-2,6,10-tridecatrienoate wherein alkyl is a hydrocarbon of one to five carbon atoms in a semi-stereospecific manner which are useful intermediates for the preparation of juvenile hormone and to novel intermediates therefor.

2 Claims, No Drawings

PREPARATION OF TRIDECATRIENOIC ACID DERIVATIVES

STATE OF THE ART

The alkyl 3,11-dimethyl-7-ethyl-2,6,10-tridecatrienoates are very important compounds as intermediates for the preparation of methyl 3,11-dimethyl-7-ethyl-10-epoxy-2,6-tridecadienoate also known as juvenile hormone and its analogs. Juvenile hormone is a known natural product which can be extracted from the abdominal tissue of adult male Hyalophora Cecropia [C. M. Williams, *Nature*, Vol. 178, (1956), p. 212]. It has an interesting biological activity, particularly insecticidal activity.

The extraction processes for the recovery of juvenile hormone have been abandoned in favor of synthetic methods due to the expensive and uncertain supply of raw material and a lengthy purification. Numerous synthetic processes for the preparation of juvenile hormone are known such as that described by K. H. DAHM, [*J.A.C.S.*, Vol. 89, (1967), p. 5292] but all the known processes have a number of disadvantages. The processes are either linear multi-stage synthesis or a convergent multi-stage synthesis but without sufficient stereospecific characters. This is important since it is known that the trans trans cis isomer of methyl 3,11-dimethyl-7-ethyl-10-epoxy-2,6-tridecadienoate has the greatest activity and is, therefore, the desired isomer.

OBJECTS OF THE INVENTION

It is an object of the invention to provide a novel process for the preparation of alkyl 3,11-dimethyl-7-ethyl-2,6,10-tridecatrienoates which correspond to the most active isomer of juvenile hormone.

It is a further object of the invention to provide novel intermediate products.

These and other objects and advantages of the invention will become obvious from the following detailed description.

THE INVENTION

The novel process of the invention for the preparation of alkyl 3,11-dimethyl-7-ethyl-2,6,10-tridecatrienoate wherein alkyl is a hydrocarbon of one to five carbon atoms comprises reacting 1-bromo-2-methyl-1-butene with lithium to obtain 2-methyl-1-butenyl-1-lithium, reacting the latter with ethyl vinyl ketone in the presence of a copper halide where the halide is selected from the group consisting of chlorine, bromine and iodine to obtain 7-methyl-6-nonene-3-one, reacting the latter with triphenyl 4-methyl-5-carboxy-4-pentenyl phosphonium bromide in the presence of a strong base in a polar solvent to obtain 3,11-dimethyl-7-ethyl-2,6,10-tridecatrienoic acid and reacting the latter with an alkyl esterification agent to obtain the corresponding alkyl 3,11-dimethyl-7-ethyl-2,6,10-tridecatrienoate. The alkyl ester may be methyl, ethyl, propyl, isopropyl, butyl, isobutyl or tert-butyl.

In a modification of the process, 5-bromo-2-pentanone is reacted in the presence of an alkali amide, hydride or alkanolate in a polar solvent with alkyl dialkyl-phosphonoacetate of the formula:

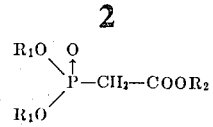

wherein $R_1$ is methyl or ethyl and $R_2$ is methyl, ethyl or tertbutyl to obtain alkyl 3-methyl-6-bromo-2-hexenoate of the formula

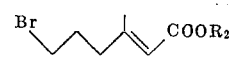

which then is subjected to alkaline or acid hydrolysis to form 3-methyl-6-bromo-2-hexenoic acid and the said acid is reacted with triphenyl phosphine in a polar solvent to obtain triphenyl 4-methyl-5-carboxy-4-pentenyl phosphonium bromide. The said bromide can then be used in the process of the invention to react with 7-methyl-6-nonene-3-one to obtain 3,11-dimethyl-7-ethyl-2,6,10-tridecatrienoic acid which is then esterified to the corresponding alkyl ester.

The semi-stereospecificity of the process is easily demonstrated by the convergent step which results in the formation of only 2 isomers of alkyl 3,11-dimethyl-7-ethyl-2,6,10-tridecatrienoate which are easily separated in contrast to the known processes which resulted in a minimum of four isomers which requires a long, difficult and expensive separation.

The process of the invention can be used to form the trans trans cis and the trans cis cis isomers of alkyl 3,11-dimethyl-7-ethyl-2,6,10-tridecatrienoate by reacting 7-methyl-6 cis-nonene-3-one with triphenyl trans-4-methyl-5-carboxy-4-pentenyl-phosphonium bromide in the presence of potassium tert-butylate in dimethylformamide to obtain a mixture of trans trans cis and trans cis cis 3,11-dimethyl-7-ethyl-2,6,10-tridecatrienoic acid which are esterified and then separated by known physical methods. The esterification is preferably effected with diazomethane to obtain the methyl esters.

7-methyl-6 cis-nonene-3-one can be prepared by reacting 1-bromo-2-methyl-1 cis-butene with lithium to obtain 2-methyl-1 cis-butenyl-1-lithium which is reacted with ethyl vinyl ketone in the presence of copper iodide. In contrast to known methods, this preparation is completely stereospecific.

Triphenyl trans-4-methyl-5-carboxy-4-pentenylphosphonium bromide is prepared by reacting 5-bromo-2-pentanone in tetrahydrofuran in the presence of sodium hydride with alkyl dialkyl-phosphonoacetate of formula I to obtain a cis and trans mixture of alkyl 3-methyl-6-bromo-2-hexenoate of formula II, separating the cis and trans isomers by known means, reacting the trans isomer with p-toluene sulfonic acid or sodium hydroxide followed by treating in acetonitrile with triphenylphosphine the trans isomer of the 3-methyl 6-bromo 2-hexenoic acid obtained to form the desired trans phosphonium bromide.

The separation of the trans trans cis and trans cis cis isomers of alkyl 3,11-dimethyl-7-ethyl-2,6,10-tridecatrienoate and the cis and trans isomers of alkyl 3-methyl 6-bromo 2-hexenoate may be made by known physical methods such as fractional distillation or chromatography.

The esterification agent used for the transformation of 3,11-dimethyl-7-ethyl-2,6,10-tridecatrienoic acid into its esters may be a diazoalkane corresponding to the desired ester and the operation is preferably effected in an organic solvent such as methylene chloride, chloroform and dichloroethane.

An alkyl halide may also be used as esterification agent such as alkyl iodide or bromide corresponding to the desired ester, which is reacted with potassium or sodium salt of the said acid. It is also possible to use a dialkylsulfate corresponding to the desired ester in the presence of a basic agent such as sodium bicarbonate.

Other methods are also appropriate such as using as esterification agent a dialkylacetal of dimethyl formamide corresponding to the desired ester, or those that use when forming the methyl ester, methanol in the presence of dimethylacetal of acetone.

1-bromo-2-methyl-1-butene and more particularly its cis isomer may be prepared by the method described by J. W. CORNFORTH [*J. Biol. Chem.* Vol. 24, 3970 (1966)]. The alkyl dialkylphosphonoacetates of formula I can be easily prepared by a method analogous to that described by A. E. ARBUSOW [*Journal de Physique-Chimie General Russe*, Vol. 46, 297 (1914)], wherein a trialkyl phosphite is condensed with an alkyl bromoacetate.

In the following examples there are described several preferred embodiments to illustrate the invention. However, it is to be understood that the invention is not intended to be limited to the specific embodiments.

EXAMPLE I

Triphenyl Trans-4-methyl-5-carboxy-4-pentenyl-phosphonium bromide

STEP A: Tertiary-butyl diethylphosphonoacetate 28.2 gm of triethyl phosphite were heated at 150° – 155°C with a few drops of tert-butyl bromoacetate and then 30 gm of tert-butyl bromoacetate were added. The heating was continued until the end of distillation of the formed ethyl bromide and the product was redistilled in vacuo to obtain 34.2 gm of tert-butyl diethylphosphonoacetate boiling at 95° – 96°C and having a refractive index $[n]_D^{20} = 1.4326$. The product occurred as a colorless liquid soluble in most of the usual organic solvents and insoluble in water.

Analysis: $C_{10}H_{21}O_5P$; molecular weight = 252.25
Calculated: %C 47.61 %H 8.39 %P 12.28
Found: 47.6 8.0 11.9
I.R. Spectrum:
Presence of ester of $\overline{P\rightarrow O}$ and $\overline{P-O-C}$ As far as is known, this compound is not described in the literature.

STEP B: Tert-butyl 3-methyl-6-bromo-2-hexenoate, trans isomer 10.6 gm of sodium hydride were introduced into 250 ml of anhydrous tetrahydrofuran, and a solution of 60 gm of tert-butyl diethylphosphonoacetate in 100 ml of tetrahydrofuran was added while maintaining the temperature between 25° and 30°C. The mixture was agitated for 30 minutes at room temperature and then a solution of 43 gm of 5-bromo-2-pentanone in 50 ml of tetrahydrofuran was added thereto while maintaining the temperature at 25°C. The mixture was agitated for 17 hours at room temperature and was then decanted. The solvent was evaporated, and the residue was taken up in water. The solution was extracted with benzene, and the benzene phase was washed with water, dried over sodium sulfate and evaporated to dryness to obtain 58.2 gm of a mixture of isomers which was separated by chromatography over silica gel and elution with a petroleum ether-ethyl acetate mixture (97:3). After evaporation of the eluant, 27 gm of tert-butyl 3-methyl-6-bromo-2-hexenoate, trans isomer were obtained as a colorless liquid boiling at 93°C at 0.5 mm Hg, and having a refractive index $[n]_D^{20} = 1.4837$.

As far as is known, this compound has not been described in the literature.

Using the same procedure, methyl 3-methyl-6-bromo-2-hexenoate having a boiling point of 84.5°C at 1.5 mm Hg and a refractive index $[n]_D^{21} = 1.4975$ was prepared starting from methyl dimethylphosphonoacetate and 5-bromo-2-pentanone.

As far as is known, this compound has not been described in the literature.

STEP C: Trans 3-methyl-6-bromo-2-hexenoic acid

A mixture of 30 gm of tert-butyl 3-methyl-6-bromo-2-hexenoate, trans isomer, 600 ml of benzene and 3 gm of p-toluene sulfonic acid was refluxed with agitation for 10 hours and after the mixture was cooled, it was washed with an aqueous solution of sodium chloride and evaporated to dryness. The residue was dissolved in hot petroleum ether, and the solution was filtered and the product crystallized by cooling to obtain 20.5 gm of 3-methyl-6-bromo-2-hexenoic acid, trans isomer, as a colorless solid melting at 75°C. It was soluble in benzene, slightly soluble in petroleum ether, and insoluble in water.

Analysis: $C_7H_{11}BrO_2$; molecular weight = 207.07
Calculated: %C 40.60 %H 5.36 %Br 38.59
Found: 40.5 5.3 38.8
I.R. Spectrum:
Presence of carbonyl at $1,692^{cm-1}$ and of —C=C— at $1,643^{cm-1}$ As far as is known, this compound has not been described in the literature.

This compound was also prepared starting from methyl 3-methyl-6-bromo-2-hexenoate, trans isomer by saponification with sodium hydroxide.

STEP D: Triphenyl 4-methyl-5-carboxy-4-pentenyl-phosphonium bromide, trans isomer A mixture of 20.5 gm of 3-methyl-6-bromo-2-hexenoic acid, trans isomer, 250 ml of acetonitrile and 80 gm of triphenylphosphine was refluxed for 24 hours, and then was heated at 50°C for 60 hours. The mixture was cooled and 1,500 ml of benzene were added. The mixture was vacuum filtered, and the crystals were washed with benzene, then with ether and dried in vacuo to obtain 44 gm of triphenyl 4-methyl-5-carboxy-4-pentenyl-phosphonium bromide, trans isomer melting at about 170°C. The product occurred as a colorless solid soluble in chloroform and insoluble in benzene and ether. The product was used as is in Example III.

As far as is known, this compound has not been described in the literature.

EXAMPLE II

Cis 7-methyl-6-nonene-3-one

STEP A: Cis isomer of 2-methyl-1-butenyl-1-lithium 1.45 gm of lithium with 1 percent of sodium were suspended in 30 ml of ether and the suspension was cooled to between 0°C and +5°C under an inert atmosphere.

A solution of 15 gm of 1-bromo-2-methyl-1-butene, cis isomer [obtained by the process of J. W. CORNFORTH, *J. Biol. Chem.* Vol. 24, 3970, (1966)] in 70 ml of ether was added without surpassing +5°C and the mixture was agitated for 1 hour at this temperature, and then decanted to obtain 90 ml of a 0.94 N solution of 2-methyl-1-butenyl-1-lithium which was used as is in the next step.

STEP B: Cis isomer of 7-methyl-6-nonene-3-one 90 ml of the lithium solution obtained in step A were added to 19 gm of cuprous iodide suspended in 200 ml of ether cooled to −55°C and the mixture was agitated for 5 minutes at −50°C. A solution of 7 ml of ethyl vinyl ketone in 20 ml of ether was added thereto and the reaction mixture was agitated for 30 minutes between −40° to −45°C and then was poured into a 10 percent aqueous solution of ammonium chloride. The precipitate was recovered by vacuum filtration and the filter was washed with water and then with ether. The ether phases were decanted and the aqueous phase was extracted with ether. The combined ether phases were washed with water, dried over sodium sulfate and evaporated to dryness in vacuo. The residue was chromatographed over silica gel and eluted with a petroleum ether-ether (9:1) mixture to obtain 4.9 gm of 7-methyl-6-nonene-3-one, cis isomer as a colorless liquid soluble in most usual organic solvents, and insoluble in water. The liquid had a boiling point of about 55°C at 1.3 mm Hg.

For analysis, the semi-carbazone was prepared by treating the product with semi-carbazide hydrochloride in the presence of sodium acetate in ethanol containing 30 percent of water to obtain the semi-carbazone melting at 130°C.

Analysis:
Calculated: %C 62.52 %H 10.02 %N 19.89
Found: 61.9 9.8 19.7

I.R. Spectrum:
Presence of C=O at $1,709^{cm-1}$

RMN Spectrum:
Ethyl triplets at 49.5 – 57.0 – 64.5 – 55.5 – 62.5 – 69.5 Hz
Methyl at double bond 99 to 100 Hz
Methylene 110 to 156 Hz
Ethylene proton at 295–302–309 Hz

EXAMPLE III 3,11-dimethyl-7-ethyl-2,6,10-tridecatrienoic acid, trans trans cis and its methyl ester.

1 gm of 7-methyl-6-nonene 3-one, cis isomer (obtained in example II) and 2.8 gm of triphenyl 4-methyl-5-carboxy-4-pentenyl-phosphonium bromide, trans isomer (obtained in example I) were dissolved in 23 ml of dimethylformamide cooled to between −25° to −30°C and then 1.35 gm of potassium tert-butylate in 7 ml of dimethylformamide were added while maintaining the temperature between −25° and −30°C. The temperature was allowed to rise slowly to −5°C and the suspension was poured into N/100 hydrochloric acid. The mixture was extracted with methylene chloride, and the organic phases were washed with water, dried over sodium sulfate and evaporated to dryness in vacuo to obtain 3.5 gm of 3,11-dimethyl-7-ethyl-2,6,10-tridecatrienoic acid.

The product was purified in the form of its methyl ester by dissolving the residue in 50 ml of methylene chloride cooled to +10°C and adding thereto the theoretical amount of diazomethane in a methylene chloride solution. The solvent was evaporated, and the residue was chromatographed over silica gel and eluted with a petroleum ether-ether mixture (95:5) to obtain 800 mg of the methyl ester of 3,11-dimethyl-7-ethyl-2,6,10-tridecatrienoic acid in the form of a trans trans cis and trans cis cis isomer mixture. The two isomers were separated by chromatography over silica gel impregnated with silver nitrate and elution with a benzene-cyclohexane mixture (8:2) to obtain 165 mg of the methyl ester of 3,11-dimethyl-7-ethyl,2,6,10-tridecatrienoic acid, trans trans cis as a liquid soluble in most usual organic solvents, and insoluble in water.

I.R. Spectrum:
Presence of C=O at $1,708^{cm-1}$, of C=C at $1,642^{cm-1}$ and of

associated with the ester at $866^{cm-1}$.

RMN Spectrum:
Peaks at 57, 100, 129, 305, 341 and 221.5 Hz.

By selective epoxidation of the 10,11-position of the trans, trans, cis derivative, juvenile hormone was obtained (COREY, *J.A.C.S.* [1968] 5618).

Various modifications of the products and processes of the invention may be made without departing from the spirit or scope thereof and it should be understood that the invention is to be limited only as defined in the appended claims.

We claim:

1. A process for the preparation of alkyl 3,11-dimethyl-7-ethyl-2,6,10-tridecatrienoate wherein alkyl is a hydrocarbon of one to five carbon atoms comprising reacting 1-bromo-2-methyl-1-butene with lithium to obtain 2-methyl-1-butenyl-1-lithium, reacting the latter with ethyl vinyl ketone in the presence of a copper halide where the halide is selected from the group consisting of chlorine, bromine and iodine to obtain 7-methyl-6-nonene-3-one, reacting the latter with triphenyl 4-methyl-5-carboxy-4-pentenyl-phosphonium bromide in the presence of a strong base in a polar solvent to obtain 3,11-dimethyl-7-ethyl-2,6,10-tridecatrienoic acid and reacting the latter with an alkyl esterification agent to obtain the corresponding alkyl, 3,11-dimethyl-7-ethyl-2,6,10-tridecatrienoate.

2. A process for the preparation of alkyl 3,11-dimethyl-7-ethyl-2,6,10-tridecatrienoate wherein alkyl has one to five carbon atoms comprising reacting 5-bromo-2-pentanone in the presence of a base selected from the group consisting of alkali metal amides, alkali metal alcoholates and alkali metal hydrides in a polar solvent with an alkyl dialkyl-phosphonoacetate of the formula:

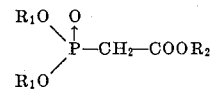

wherein $R_1$ is selected from the group consisting of methyl and ethyl and $R_2$ is selected from the group consisting of methyl, ethyl and tert-butyl to obtain alkyl 3-methyl-6-bromo-2-hexenoate of the formula:

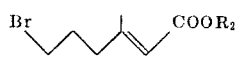

hydrolyzing the latter to form 3-methyl-6-bromo-2-hexenoic acid, reacting the said acid with triphenyl phosphine in a polar solvent to obtain triphenyl 4-methyl-5-carboxy-4-pentenyl-phosphonium bromide, reacting the latter with 7-methyl-6-nonene-3-one in the presence of a strong base in a polar solvent to form 3,1-1-dimethyl-7-ethyl-2,6,10-tridecatrienoic acid and esterifying the latter to form the alkyl ester.